United States Patent [19]
Nakamura et al.

[11] 3,961,843
[45] June 8, 1976

[54] LIQUID CRYSTAL ELECTRO-OPTICAL DEVICE

[75] Inventors: Kenji Nakamura; Keizo Matsushita, both of Kamahura; Shigetaro Furuta, Fujisawa; Kazuo Totani, Kamakura, all of Japan

[73] Assignee: Dai Nippon Toryo Kabushiki Kaisha, Osaka, Japan

[22] Filed: Nov. 11, 1974

[21] Appl. No.: 522,834

[30] Foreign Application Priority Data
June 29, 1974 Japan.................................. 49-73830
July 31, 1974 Japan.................................. 49-87082

[52] U.S. Cl............................................ 350/160 LC
[51] Int. Cl.$^2$........................................... G02F 3/00
[58] Field of Search.............................. 350/160 LC

[56] References Cited
UNITED STATES PATENTS
| | | | |
|---|---|---|---|
| 3,728,008 | 4/1973 | Allan | 350/160 LC |
| 3,836,231 | 9/1974 | Cole, Jr. | 350/160 LC |
| 3,854,793 | 12/1974 | Kahn | 350/160 LC |
| 3,864,021 | 2/1975 | Katagiri | 350/160 LC |

*Primary Examiner*—John K. Corbin
*Assistant Examiner*—Rolf Hille
*Attorney, Agent, or Firm*—Sughrue, Rothwell, Mion, Zinn & Macpeak

[57] ABSTRACT

In a structure comprising a pair of facing electrode plates and a layer of a nematic liquid crystal having a positive dielectric anisotropy, which is supported between said facing electrode plates, when each of the electrode surfaces coming into contact with the nematic liquid crystal layer is provided with a coating of poly-p-xylylene and/or its substituted product and the surface of said coating is furnished with a predetermined orientation, a liquid crystal device of the torsion effect type having good electro-optical characteristics is provided. When a layer of an epoxy resin or silane coupling agent is formed between the coating of the poly-p-xylylene type resin and the electrode surface, the adhesion of the poly-p-xylylene type resin coating is improved.

7 Claims, No Drawings

LIQUID CRYSTAL ELECTRO-OPTICAL DEVICE

BACKGROUND OF THE INVENTION

This invention relates to a liquid crystal device of the torsion effect type formed by employing a nematic liquid crystal material having a positive dielectric anisotropy (hereinafter referred to merely as "Np-liquid crystal").

In a liquid crystal device of the torsion effect type, the change of orientation of the Np-liquid crystal molecules caused under application of an electric field, a magnetic field, a ultrasonic wave or the like is utilized for light modulation. When an electric field is applied, there is employed a liquid crystal device of the torsion effect type formed by applying a transparent conductive coating on one surface of a support such as glass sheet to form an electrode plate, arranging a pair of so formed electrode plates so that the coated electrode surfaces confront each other (the distance between the two electrode plates is usually 1 to 100 $\mu$), to thereby form a cell, and filling an Np-liquid crystal material into the cell according to customary methods such as a pressure injection method comprising charging the liquid crystal material into the cell under pressure by using an injector, or a vacuum injection method comprising maintaining the inside of the cell under vacuum and then charging the liquid crystal into the cell under atmospheric pressure. In this case, the electrode surface is pre-treated so that the Np-liquid crystal molecules are oriented in a certain direction, and a pair of the so treated electrode plates are arranged so that the orientation direction of the Np-liquid crystal molecules in one electrode surface crosses vertically the orientation direction of the Np-liquid crystal molecules in the other electrode surface. In the so obtained liquid crystal device, the Np-liquid crystal molecules are oriented in such state that the direction of the long axis of the molecule is in parallel to the electrode surface and between the electrode surfaces the molecules are continuously twisted by 90°. Since the pitch of this torsion is much larger than the wavelength of light, plane of polarization of linear polarized light perpendicular to the electrode plate is rotated by 90° while it is passing through this liquid crystal device of the torsion effect type. Accordingly, this liquid crystal device of the torsion effect type shields light when it is disposed between two polarizers arranged so that light oscillating faces of the polarizers are in parallel to each other, and when the liquid crystal device is disposed between two polarizers arranged so that light oscillating faces of the polarizers cross vertically each other, it allows transmission of light. When a voltage is applied to this liquid crystal device of the torsion effect type, in response to the applied voltage the long axis direction of Np-liquid crystal molecules is inclined to the electric field direction, and at a voltage exceeding a certain limit the Np-liquid crystal molecules are arranged so that the long axis direction is substantially in parallel to the electric field direction. In this state, contrary to the case of no application of voltages, the Np-liquid crystal device allows transmission of light when it is disposed between parallelly arranged polarizers but it shields light when it is disposed between polarizers arranged vertically to each other. Accordingly, when such liquid crystal device of the torsion effect type is inserted between two polarizers, the liquid crystal device changes its state from the light shielding state to the light transmitting state or from the light transmitting state to the light shielding state in response to the applied voltage, and this change, namely light modulation, can be utilized for display or the like.

In preparing liquid crystal devices of the torsion effect type (hereinafter referred to simply as "liquid crystal device"), it is important that electrode surfaces should be treated so that Np-liquid crystal molecules are oriented in a certain direction. As the conventional electrode surface treatment method, there can be mentioned a method comprising polishing the electrode surface in a certain direction directly with dry cloth, paper, rubber or the like. According to this conventional method, however, it is impossible to orient liquid crystal molecules sufficiently and uniformly so that the long axes of the liquid crystal molecules are in parallel to the electrode surface. Accordingly, in the resulting liquid crystal device, orientation of the liquid crystal molecules is insufficient and non-uniform, which results in the following defects of electro-optical characteristics:

1. Operation voltage is high.
2. A liquid crystal device having an area exceeding 1 cm$^2$ fails to show a uniform electro-optical response throughout the liquid crystal device.
3. Differences in the operation voltage of about 1.5 to 2 times occur throughout the same device.
4. It is difficult to obtain a good contrast ratio.

The conventional methods for treating the electrode surface as mentioned above are disadvantageous in that the polishing of the electrode surface needs a high pressure of 10 to 50 kg/cm$^2$ so that it is difficult to prepare stabilized devices and in the mass production differences in the operation voltage of 1.5 to 3.0 times occur among the devices.

As the electrode surface treatment means overcoming these defects, there has been proposed a method comprising forming on the electrode surface a coating of an organic polymeric material such as a silicone resin, an epoxy resin, an acrylic resin and a phenol resin and polishing this coating with cloth, paper or the like (U.S. patent application Ser. No. 485,036 filed on July 1, 1974). According to our experiments, however, it is impossible to obtain liquid crystal devices having satisfactory electro-optical characteristics, and when mass production is conducted according to this method, deviation of electro-optical characteristics is very great among lots. The above U.S. patent application discloses a liquid crystal device including electrode plates formed by coating a cellulose resin on the electrode surface and lightly polishing the coating in one direction with a brush, paper, cloth or the like, and it is taught that this device has a good orientation in Np-liquid crystal molecules and in turn, good electro-optical characteristics, and that no deviation of electro-optical characteristics is brought about among lots in the case of mass production. However, a cellulose resin coating is defective in that its heat stability and chemical resistance are poor. More specifically, the softening point of a cellulose resin is low and therefore, when an electrode having a surface coated with a cellulose resin is heated at a temperature higher than 150°C., the resin coating is softened and the effect of the polishing treatment made on the resin coating is lost. Especially, nitrocellulose is inferior in the heat stability and it is decomposed when it is heated at a temperature higher than 140°C. Further, the resistance of a cellulose resin to organic solvents such as alcohols, ketones, esters and aromatic hydrocarbons is insufficient, and it is easily swollen upon contact with these organic solvents and easily dissolved therein.

When a cell for an Np-liquid crystal is prepared by using a pair of electrode plates, there is generally adopted a method comprising coating a thin band of a high molecular adhesive such as an epoxy resin, a melamine resin, a phenol resin, an acrylic resin or a urethane resin on the peripheral edge portion of the electrode surface of one of pre-treated electrode plates except for an opening for charging of an Np-liquid crystal material according to the screen printing method, and bonding the other pre-treated electrode plate to the adhesive coated electrode plate so that both the electrode surfaces confront each other and the treatment direction on the electrode surface of one electrode plate crosses vertically the treatment direction on the electrode surface of the other electrode plate. In the so prepared cell, a thin band of the polymeric adhesive formed on the peripheral edge portion acts not only as a spacer for keeping a certain distance between the two electrode plates but also as a sealing agent for bonding the two electrode plates. In this case, use of a high temperature curing adhesive is preferred. The reasons are as follows:

When a high temperature curing adhesive is employed, a reaction to high molecules is promoted completely by heating and a pair of electrode plates are tightly bonded and sealed. Simultaneously, no unreacted low molecular weight by-product is left because of completion of the reaction to high molecules. The presence of such low molecular weight by-product is considered to be one of causes of degradation of an Np-liquid crystal material charged in the so formed cell, because such by-product reacts with molecules of the Np-liquid crystal.

As is apparent from the foregoing, when a cell is prepared by using a pair of polish-treated electrode plates having an electrode surface coated with a cellulose resin, the high molecular adhesive of a high temperature curing type cannot be used, but a low temperature curing or room temperature curing adhesive is reluctantly used. As pointed above, a high molecular adhesive is coated on the electrode surface by the screen printing method. In this coating method, an organic solvent is added to the high molecular adhesive to adjust its viscosity to one suitable for coating. As stated above, a cellulose resin is insufficient in the chemical resistance, and therefore, in the case of electrode plates having a cellulose resin coating, the kind of the solvent to be used for coating of the high molecular adhesive should naturally be limited.

SUMMARY OF THE INVENTION

It is a primary object of this invention to provide a liquid crystal device of the torsion effect type having good electro-optical characteristics.

Another object of this invention is to provide a liquid crystal device of the torsion effect type which can be prepared with good working efficiency and is characterized in that no deviation of electro-optical characteristics is brought about among lots on mass production.

Still another object of this invention is to provide a liquid crystal device of the torsion effect type in which the electrode surface has a coating excellent in both the heat stability and the chemical resistance.

In accordance with this invention, there is provided a liquid crystal electro-optical device comprising a pair of facing electrode plates and a layer of a nematic liquid crystal material having a positive dielectric anisotropy, which is inserted and supported between said electrode plates, electrode surfaces of said electrode plates coming into contact with said nematic crystal material being coated with a poly-p-xylylene represented by the following general formula:

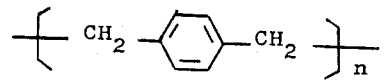

wherein $n$ is about 5,000 when the poly-n-xylylene coating is prepared by the thermal decomposition polymerization described below, and/or at least one member selected from poly-p-xylylene substituted products represented by the following general formula:

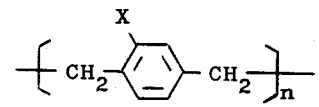

or

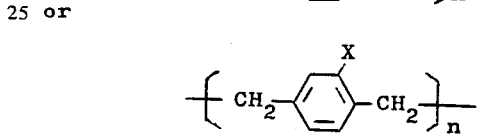

wherein $n$ is as defined above, and X stands for a halogen atom, an alkyl group, an ester residue or an alkoxy group, and said coating surface being polished in one direction.

The adhesion of the coating of the poly-p-xylylene and/or its substituted product to the electrode surface can be improved when an epoxy resin layer or a silane coupling layer is formed between said coating of the poly-p-xylylene and/or its substituted product and the electrode surface.

DETAILED DESCRIPTION OF THE INVENTION

Coating of poly-p-xylylene or its substituted product on the electrode surface can be accomplished not only the thermal decomposition polymerization but also the Wurtz-Fittig reaction, the Friedel-Craft reaction and the Hofmann decomposition. In view of the fact that a coating having a higher molecular weight can be obtained, the thermal decomposition polymerization is preferred. This polymerization method is conducted in the following manner.

First, p-xylene or its substituted product is heated at 950°C. in the presence of steam, and it is abruptly cooled by benzene or toluene to form di-p-xylylene or its substituted product. Then, the so formed di-p-xylylene or its substituted product is heated at 600°C. under reduced pressure. By this heating, the di-p-xylylene or its substituted product is quantitatively converted to p-xylylene or its substituted product. The so formed p-xylylene or its substituted product is contacted with an electrode surface maintained at room temperature to thereby deposite a polymer layer. Thus, there is formed a coating of poly-p-xylylene or its substituted product on the electrode surface.

The thickness of the coating of poly-p-xylylene or its substituted product is not particularly critical, but with increase of the thickness, the response voltage becomes high. In view of this point, it is preferred that the thickness of the coating be less than 1 μ, especially from about 0.1 to about 0.5 μ.

As the substituted product of poly-p-xylylene, there can be mentioned, for example, polychloro-p-xylylene which is obtained from dichloro-p-xylylene according to the thermal decomposition polymerization method.

According to the above thermal decomposition polymerization method utilizing the polymerizing property of p-xylylene or its substituted product, a coating of poly-p-xylylene or its substituted product having a melting point of about 400°C., which is free of a low molecular weight by-product, is obtained. This coating of poly-p-xylylene or its substituted product is colorless and transparent, and its gas permeability is low. Further, this coating is excellent in the chemical resistance. More specifically, the coating is insoluble in organic solvents such as alcohols, ketones, esters and aromatic hydrocarbons at room temperature.

The electrode surface which is coated with poly-p-xylylene or its substituted product is subjected to the polishing treatment using a brush, paper, cloth or the like. A high pressure need not be applied at the polishing treatment and good results are obtained when the polishing treatment is conducted under a pressure customarily adopted for the polishing treatment of cellulose resin coatings. More specifically, polishing is conducted several times in one direction under application of a pressure of at least 1 g/cm². Especially good orientation of the Np-liquid crystal molecules can be attained when an application pressure is 5 to 100 g/cm², and in this case, a liquid crystal device having an excellent contrast ratio can be obtained.

The distance between the electrode surfaces of a pair of the so treated electrode plates is kept constant by means of a spacer and the peripheral edge portions are sealed by a high molecular adhesive to form a cell (as pointed above, the high molecular adhesive frequently acts as the spacer). An Np-liquid crystal material is filled in the so formed cell to obtain a liquid crystal device.

In the liquid crystal device of this invention, since the coating of poly-p-xylylene or its substituted product formed on the electrode surface is excellent in the thermal stability, a high molecular adhesive of high temperature curing type can be used at the preparation step. Accordingly, a tight seal is formed and since the reaction to high molecules is advanced completely, an unreacted low molecular weight by-product considered to be one cause of degradation of the liquid crystal is not at all formed. The coating of poly-p-xylylene or its substituted product is neither decomposed nor softened even when it is heated at such a high temperature as 200°C., and hence, the effect of the polishing treatment made on the coating is neither lost nor reduced at such high temperatures. Still further, the coating of poly-p-xylylene or its substituted product is excellent in the chemical resistance. Therefore, at the sealing step using a high molecular adhesive of high temperature curing type, the kind and amount of the solvent can freely be chosen. The term of a high molecular adhesive of high temperature curing type used herein means one having a curing temperature higher than about 150°C.

Table 1 shows data of the threshold voltage and saturation voltage obtained with respect to the liquid crystal device of this invention having an electrode surface coated with poly-p-xylylene and comparative liquid crystal device formed by using as coating resin five cellulose resins and acrylic, melamine, epoxy and phenol resins. In each device the thickness of the coating is about 1 μ and as the Np-liquid crystal material, there is employed an Np-liquid crystal composition consisting of 27% by weight of p-methoxybenzylidene-p'-n-butylaniline, 27% by weight of p-ethoxybenzylidene-p'-n-butylaniline, 26% by weight of p-ethoxybenzylidene-p'-n-heptylaniline, 10% by weight of p-cyanobenzylideneaniline and 10% by weight of p-cyanophenyl-p'-n-octyloxybenzoate. The distance between the electrode surfaces are adjusted to 7 ± 1.5 μ. The pressure applied at the polishing treatment of the electrode surface is 10 g/cm² in the case of cellulose resins and poly-p-xylylene and 30 Kg/cm² in the case of other resins. With respect to each device, 100 samples are prepared as one lot to examine deviation of the threshold voltage and saturation voltage among samples. In Table 1, the deviation is indicated by the length of the arrow.

Table 1

| Resin | Voltage (Vrms) Threshold voltage (upper) and saturation voltage (lower) 2 4 6 8 10 12 14 16 18 20 |
|---|---|
| Poly-p-xylylene | ↔ ↔ |
| Nitrocellulose (HIG 40 manufactured by Asahi Kasei) | ↔ ↔ |
| Acetylcellulose (LT-105 manufactured by Dai Cel) | ↔ ←——→ |
| Cellulose acetate butyrate (EAB-171-2 manufactured by Eastman Kodak) | ↔ ←——→ |
| Cellulose acetate propionate (ASP manufactured by Eastman Kodak) | ↔ ↔ |
| Methyl cellulose (65SH-4000 manufactured by Shinetsu Chemical) | ↔ ←——→ |
| Acrylic resin (RE-377 manufactured by Mitsubishi Rayon) | ←——→ ←———→ |
| Melamine resin (Delicon No. 500 manufactured by Dainippon Toryo) | ←——→ ←———→ |
| Epoxy resin (AER No. 664 manufactured by Asahi Kasei) | ←——→ ←———→ |
| Phenol resin (Beckosol manufactured by Dainippon Ink) | ↔ ←———→ |

2 4 6 8 10 12 14 16 18 20

As is apparent from the data shown in Table 1, in the liquid crystal device of this invention having the electrode surface coated with poly-p-xylylene, either the threshold voltage or the saturation voltage is much lower than in comparative devices having the electrode surface coated with an acrylic, melamine, epoxy or phenol resin, and said voltages of the device of this invention are comparable to those of devices having the electrode surface coated with a cellulose resin. From the data shown in Table 1, it is also seen that in the liquid crystal device of this invention having the electrode surface coated with poly-p-xylylene, deviations of the threshold voltage and saturation voltage are much reduced as in the liquid crystal devices having the electrode surface coated with cellulose resins. In Table 1, by "threshold voltage" is meant a voltage at which the quantity of transmission light is changed by 10% relative to the quantity of transmission light under no application of voltages, and by "saturation voltage" is meant a voltage at which the quantity of transmission light is changed by 90% relative to the quantity of transmission light under no application of voltages.

The uniformity of electro-optical response is examined visibly with respect to device shown in Table 1. As a result, it is confirmed that the liquid crystal device of this invention having the electrode surface coated with poly-p-xylylene shows a more uniform electro-optical response than other comparative liquid crystal devices. In the case of the liquid crystal device of this invention shown in Table 1 no substantial difference of the operating voltage is brought about in one sample and the difference of operating voltage in one sample is less than 1% as in the case of devices formed by employing cellulose resins.

The same effects as mentioned above are obtained when substituted products of poly-p-xylylene are used instead of poly-p-xylylene.

Table 2 shows data of variation in the maximum contrast ratio (quantity of transmission light under no application of voltage/quantity of transmission light under application of saturation voltage) obtained with respect to a liquid crystal device of this invention formed by coating the electrode surface with poly-p-xylylene and polishing the poly-p-xylylene coating under application of a pressure of 1 g/cm² to 1 kg/cm² and comparative liquid crystal devices formed by coating the electrode surface with a nitrocellulose, acrylic, melamine, epoxy or phenol resin and polishing the coating under application of a pressure of 1 g/cm² to 1 kg/cm² in the case of nitrocellulose or 10 kg/cm² to 50 kg/cm² in the case of other resins. In each device, the thickness of the coating, the Np-liquid crystal material and the spacing between the electrode surfaces are the same as in the devices shown in Table 1.

Table 2

| Resin | Maximum contrast ratio |
|---|---|
| | 0 10 20 30 40 50 60 70 80 90 100 |
| Poly-p-xylylene | ←—————————————→ |
| Nitrocellulose (HIG-40 manufactured by Asahi Kasei) | ←———————————→ |
| Acrylic resin (RE-377 manufactured by Mitsubishi Rayon) | -←—→ |
| Melamine resin (Delicon DE No. 500 manufactured by Dainippon Toryo) | ←—→ |
| Epoxy resin (AER No. 664 manufactured by Asahi Kasei) | ←—→ |
| Phenol resin (Beckosol manufactured by Dainippon Ink) | ←—→ |
| | 0 10 20 30 40 50 60 70 80 90 100 |

As is seen from the data shown in Table 2, the liquid crystal device having the electrode surface coated with poly-p-xylylene has a very high maximum contrast ratio as the device having the electrode surface coated with nitrocellulose, and it always exhibits a maximum contrast ratio higher than 35 : 1. Especially in the case of samples formed by conducting the polishing treatment under application of a pressure of 5 to 100 g/cm², a good contrast ratio ranging from 50 : 1 to 100 : 1 can be obtained. When substituted products of poly-p-xylylene are used instead of poly-p-xylylene, similarly good results can be obtained.

Further, in the liquid crystal device of this invention, the pressure applied at the polishing treatment can be reduced, and therefore, the polishing treatment can be greatly facilitated. Accordingly, in mass production, the deviation of the electro-optical characteristics among lots can be reduced, and according to this invention, it is possible to produce liquid crystal devices of the torsion effect type in large quantities and at low costs, while various difficulties are involved in preparing such liquid crystal devices according to conventional techniques and therefore, products provided according to conventional techniques are very expensive.

Poly-p-xylylene and its substituted products have a high intermolecular cohesive force because of their high crystallinity, and hence, their adhesive force to an electrode surface is low and in some cases a sufficient adhesion to an electrode plate is not attained. Accordingly, it cannot be said that in a liquid crystal device having the electrode surface coated with poly-p-xylylene or its substituted product, a sufficient bonding would always be attained between the coating and electrode surface. In fact, it sometimes happens that the coating of poly-p-xylylene or its substituted product peels from the electrode surface when the device has been used for a long time or when the ambient temperature abruptly changes. In such case, air bubbles are involved in the device and it fails to exhibit the intended activities.

In this invention, occurrence of this undesired phenomenon is prevented by providing a layer of an epoxy resin or a layer of a silane coupling agent between the coating of poly-p-xylylene or its substituted product and the electrode surface. The epoxy resin to be used as an intermediate layer-constituting material forms a strong hydrogen bond with water molecules absorbed on the surface of an article to be bonded and has a high inter-heteromolecular cohesive energy to the article to be bonded. Therefore, the epoxy resin has a high adhesive force. Further, it has a high softening point and an excellent solvent resistance. Accordingly, when an intermediate layer of such epoxy resin is formed between the electrode surface and the coating of poly-p-xylylene or its substituted product, the stability of the coating is highly enhanced.

From the point of preparation of the cell, the epoxy resin of the high temperature curing type is preferred because it is preferred to use the high molecular adhesive of the high temperature curing type as sealing agents for the cell as mentioned above.

In case the electrode substrate plate is composed of a glass sheet, the soda component is deposited on the surface of the glass sheet, resulting in reduction of adhesion between the glass surface and coating of poly-p-xylylene or its substituted product. If an intermediate layer of a silane coupling agent is formed between the glass surface and the coating of poly-p-xylylene or its substituted product, the adhesion of the coating of poly-p-xylylene or its substituted product can be sufficiently reinforced. This silane coupling agent as an adhesive medium has a sufficiently high inter-heteromolecular cohesive energy to the soda component deposited on the glass surface, and the resulting bondage is hardly lost under heating or by an action of an organic solvent. Therefore, the stability of the coating of poly-p-xylylene or its substituted product formed on the layer of this adhesive is much improved.

After the epoxy resin adhesive has been dissolved in a suitable solvent or the silane coupling agent adhesive has been dissolved in a mixed solvent of a weakly acidic aqueous solution and alcohol, such adhesive is coated on the electrode surface according to the spray coating method, the dip coating method, the brush coating method, or the roller coating method. The coated layer is dried and cured by heating. In view of the fact that a coating of poly-p-xylylene or its substituted product is formed coating of the epoxy resin or silane coupling agent, it is preferred that the thickness of the intermediate coating of the epoxy resin or silane coupling agent be thin, for example, not greater than 1.0 $\mu$, especially about 0.1 to about 0.5 $\mu$.

Poly-p-xylylene or its substituted product is coated on the so formed coating of the epoxy resin or silane coupling agent. As pointed above, it is preferred that formation of the coating of poly-p-xylylene or its substituted product be conducted according to the thermal decomposition of polymerization method.

The fact that an epoxy resin or silane coupling agent is most suitable as an intermediate layer-constituting material has been found as a result of our experiments made on various organic materials. For example, when the conventional urethane, acrylic and phenol resins and the like are used as the intermediate layer-constituting material, the adhesion of the coating of poly-p-xylylene or its substituted product is not so greatly improved as in the case of an epoxy resin or silane coupling agent.

Table 3 shows data of the adhesion of the coating of poly-p-xylylene or its substituted product to the electrode surface, obtained with respect to a liquid crystal device formed by coating an epoxy resin or silane coupling agent on the electrode surface and coating poly-p-xylylene on the so formed intermediate layer and comparative liquid crystal devices formed by using an acrylic resin, a urethane resin or a phenol resin as the intermediate layer-constituting material. Test samples were prepared in the following manner:

The epoxy resin (AER No. 669 manufactured by Asahi Kasei) was used in the form of a butylcellosolve solution containing 1.1% by weight of the resin. The silane coupling agent (A-172 manufactured by Union Carbide Corporation) was used in the form of a solution consisting of 5% by weight of the silane coupling agent, 5% by weight of an aqueous solution of acetic acid having a pH of 4.5 and 90% by weight of ethanol. As the electrode plate was employed a transparent electrode plate formed by vacuum evaporation-depositing $In_2O_3$ on a square hard glass sheet having a size of 5 cm × 5 cm so that the surface resistance was 1 K$\Omega$.cm$^2$. The intermediate layer-constituting material was brush coated on the electrode surface of this electrode plate, and the coating was dried and cured at 200°C. for 30 minutes in the case of the epoxy resin or at 200°C. for 1 hour in the case of the silane coupling agent to form a coating having a thickness of about 1.0 $\mu$. The acrylic resin (RE No. 377 manufactured by Mitsubishi Rayon) was used in the form of a xylene solution of a resin concentration of 1.0% by weight, the urethane resin (V-Chroma manufactured by Dainippon Toryo) in the form of a methylisobutyl ketone solution of a resin concentration of 1.0% and the phenol resin (Beckosol manufactured by Dainippon Ink) in the form of an acetone solution of a resin concentration of 1.0% by weight. In each case, the thickness of the intermediate layer was about 1.0 $\mu$. The foregoing three resin solutions were brush coated and dried and cured at 150°C. for 30 minutes.

A coating of poly-p-xylylene having a thickness of 0.5 $\mu$ was formed on the so formed intermediate layer by the above-mentioned thermal decomposition polymerization of di-p-xylylene. For comparison, a coating of poly-p-xylylene having a thickness of 0.5 $\mu$ was directly formed on the electrode surface without formation of an intermediate layer.

The adhesion was tested according to the cross cut adhesion. Namely, cut lines were formed on the coating with a distance of 2 mm in both the longitudinal and lateral directions by a sharp knife to form cut squares on the coating, and an adhesive cellophane tape was applied closely on the coating and the applied cellophane tape was abruptly peeled off. In this test, a coating of a low adhesion is peeled off together with the cellophane tape. When all of the cut squares of the coating are peeled off together with the cellophane tape, the degree of peeling is evaluated as 100%, and when none of the cut squares are peeled off, the degree of peeling is evaluated 0%. Results of this cross cut adhesion test made on the above-mentioned samples are shown in Table 3.

Table 3

| Intermediate Layer-Constituting Material | Degree of Peeling (%) |
|---|---|
| Epoxy resin | 0 |
| Silane coupling agent | 0 |
| Acrylic resin | 85 |
| Urethane resin | 80 |
| Phenol resin | 80 |
| Not formed | 100 |

As is seen from the results shown in Table 3, when an epoxy resin or silane coupling agent is used as a material for the intermediate layer to be formed between the electrode surface and the coating of poly-p-xylylene, the adhesion of poly-p-xylylene to the electrode surface is highly improved, and the defect of peeling of the coating of poly-p-xylylene from the electrode surface under temperature change or by polishing can be overcome by provision of an intermediate layer of an epoxy resin or silane coupling agent, and the coating of poly-p-xylylene formed on the electrode surface has a much improved stability.

In the same manner as described above with respect to samples shown in Table 3, an intermediate coating having a thickness of 1.0 $\mu$ was formed on the surface of a transparent electrode plate by using an epoxy resin, a silane coupling agent, an acrylic resin, urethane resin or a phenol resin, and a coating of polychloro-p-xylylene having a thickness of 0.5 $\mu$ was formed on the resulting intermediate coating by the thermal decomposition polymerization of dichloro-p-xylylene. The so formed samples were subjected to the adhesion test in the same manner as described above with respect to samples shown in Table 3. Results are shown in Table 4. For comparison, a coating of polychloro-p-xylylene having a thickness of 0.5 μ was directly formed on the electrode surface without formation of an intermediate layer between the electrode surface and the coating of polychloro-p-xylylene.

Table 4

| Intermediate Layer-Constituting Material | Degree of Peeling (%) |
| --- | --- |
| Epoxy resin | 0 |
| Silane coupling agent | 0 |
| Acrylic resin | 80 |
| Urethane resin | 70 |
| Phenol resin | 80 |
| Not formed | 100 |

As is seen from Table 4, results obtained with respect to samples shown in Table 4 are similar to those obtained with respect to samples shown in Table 3. From the results shown in Table 4, it will readily be understood that when an intermediate layer of an epoxy resin or a silane coupling agent is formed between the electrode surface and the coating of polychloro-p-xylylene, the adhesion of the polychloro-p-xylylene coating to the electrode surface is highly enhanced and the stability of the coating is highly improved.

The surface of a coating of poly-p-xylylene or its substituted product formed on the intermediate layer coating of an epoxy resin or a silane coupling agent is polished several times in a certain direction by a brush, paper, cloth or the like to impart an orienting property thereto. This polishing treatment is conducted under application of a pressure of at least 1 g/cm². When the polishing pressure is lower than 1 g/cm², a sufficient orienting property cannot be imparted. Especially good orientation of the liquid crystal molecules can be attained when the pressure applied at the polishing treatment is within a range of from 5 to 100 g/cm² and a liquid crystal element having a good maximum contrast ratio ranging from 50 : 1 to 100 : 1 can be obtained.

The distance between a pair of the so treated electrode plates is kept constant by means of a spacer and an Np-liquid crystal material is injected into the cell and thus, the intended liquid crystal device is prepared.

In the so obtained liquid crystal device of this invention, the adhesion of the coating of a poly-p-xylylene type resin to the electrode surface is highly improved and hence, it exhibits a good stability even when it is used for a long time or when the ambient temperature abruptly changes greatly.

This invention will now be illustrated in more detail by reference to the following Examples.

EXAMPLE 1

In$_2$O$_3$ was deposited in vacuum on a square sheet of hard glass having a size of 5 cm × 5 cm so that the surface resistance was 100 Ω cm² to form a transparent electrode plate having a light transmission ratio of 85%, and the electrode surface of the so obtained electrode plate was contacted at room temperature under reduced pressure with p-xylylene obtained by thermal decomposition of di-p-xylylene, to form a coating of poly-p-xylylene on the electrode surface. The thickness of this coating was about 0.5 μ. 5 pairs of electrode plates having the electrode surface coated with poly-p-xylylene were prepared in the above-mentioned manner, and each coating surface was polished three times in a certain direction under application of a pressure of 10 g/cm². By using these five pairs of the electrode plates, five liquid crystal devices were prepared. A high temperature curing epoxy resin adhesive (AER No. 669 manufactured by Asahi Kasei) was used as the sealing agent. This sealing agent acted also as the spacer, and it was coated on the electrode surface according to the screen printing method. Curing of the sealing agent was carried out at 200°C. for 30 minutes. As the Np-liquid crystal material, there was employed an Np-liquid crystal composition consisting 27% by weight of p-methoxybenzylidene-p'-n-butylaniline, 27% by weight of p-ethoxybenzylidene-p'-n-butylaniline, 26% by weight of p-ethoxybenzylidene-p'-heptylaniline, 10% by weight of p-cyanobenzylideneaniline and 10% by weight of p-cyanophenyl-p'-n-octyloxybenzoate. In each device, the distance between the electrode surfaces was adjusted to 7 ± 1.5 μ.

Each of the so prepared five liquid crystal devices exhibited an electro-optical response completely uniform throughout the entire surface of the device, and in these liquid crystal devices, the threshold voltage and the saturation voltage were about 5.5 Vrms and about 8.0 Vrms, respectively. Further, each of these devices had a maximum contrast ratio greater than 50 : 1.

EXAMPLE 2

In$_2$O$_3$ was deposited in vacuum on a square sheet of hard sheet having a size of 5 cm × 5 cm so that the surface resistance was 100 Ω cm², to form a transparent electrode plate having a light transmission ratio of 85%. Then, the electrode surface was contacted at 90°C. under reduced with pressure chloro-p-xylylene obtained by the thermal decomposition of dichloro-di-p-xylylene, to form a coating of polychloro-p-xylylene on the electrode surface. The thickness of the so obtained coating was about 0.5 μ. Five pairs of electrode plates having the electrode surface coated with polychloro-p-xylylene were prepared in the abovementioned manner, and each coating surface was polished three times in a certain direction under application of a pressure of 10 g/cm². By using these five pairs of the electrode plates, five liquid crystal devices were prepared. As the sealing agent, a high temperature curing epoxy resin adhesive (AER No. 669 manufactured by Asahi Kasei) was employed. This sealing agent acted also as a spacer, and it was coated on the electrode surface by the screen printing method. Curing of the sealing agent was conducted at 200°C. for 30 minutes. In each device, the Np-liquid crystal material and distance between the electrode surface were the same as in Example 1.

Each of the so prepared liquid crystal devices had an electrode-optical response completely uniform throughout the entire surface of the device. In each of these devices, the threshold voltage and saturation voltage were about 5.5 Vrms and about 8.2 Vrms, respectively, and each device had a maximum contrast ratio greater than 50 : 1.

EXAMPLE 3

In$_2$O$_3$ was deposited in vacuum on a square sheet of hard glass having a size of 5 cm × 5 cm so that the surface resistance was 100 Ω cm², to form a transparent electrode plate having a light transmission ratio of 80 – 85%. A butylcellosolve solution containing 0.3% by weight of an epoxy resin (AER No. 664 manufactured by Asahi Kasei) was brush coated on the electrode surface of the so formed electrode plate, and the coating was dried and cured at 200°C. for 20 minutes. The thickness of the resulting epoxy resin coating was about 0.3 $\mu$. The epoxy resin coating was contacted at room temperature under reduced pressure with p-xylylene obtained by the thermal decomposition of di-p-xylylene, to thereby form a coating of poly-p-xylylene on the epoxy resin coating. The thickness of the so formed coating was about 0.1 $\mu$. Ten pairs of electrode plates were prepared in the above-mentioned manner. Each coating surface was polished three times in a certain direction under application of a pressure of 10 g/cm². By using these ten pairs of electrode plates, ten liquid crystal devices were prepared. As the sealing agent, a high temperature curing epoxy resin adhesive (AER No. 669 manufactured by Asahi Kasei) was used. This sealing agent acted also as the spacer, and it was coated on the electrode surface according to the screen printing method. Curing of the sealing agent was conducted at 200°C. for 30 minutes. The same liquid crystal composition as in Example 1 was employed as the liquid crystal material. In each device, the distance between the electrode surfaces was adjusted to 7 ± 1.5 $\mu$.

Each of the so prepared ten devices had an electro-optical response completely uniformly throughout the entire surface of the device. In each of these liquid crystal devices, the threshold voltage and saturation voltage were about 4.5 Vrms and about 6.8 Vrms, respectively. Further, each of the devices had a maximum contrast ratio greater than 50 : 1.

EXAMPLE 4

In$_2$O$_3$ was deposited in vacuum on a square sheet of hard glass having a size of 5 cm × 5 cm so that the surface resistance was 100 Ω cm², to form a transparent electrode plate having a light transmission ratio of 80 – 85%. A mixture composed of 3% by weight of a silane coupling agent (A-172 manufactured by Union Carbide Corporation), 3% by weight of an aqueous solution of acetic acid having a pH of 4.5 and 94% by weight of ethanol was brush coated on the electrode surface of the so formed electrode plate. The coating was heated and dried at 200°C. for 1 hour, and the electrode plate was washed sufficiently with warm water maintained at 90°C. and then with ethanol, to thereby remove the unreacted silane coupling agent. The so formed silane coupling agent coating having a thickness of about 0.5 $\mu$ was contacted at room temperature under reduced pressure with p-xylylene obtained by the thermal decomposition of di-p-xylylene, to form a coating of poly-p-xylylene on the silane coupling agent coating. The thickness of the poly-xylylene coating was about 0.1 $\mu$. Ten pairs of electrode plates having the electrode surface coated with the silane coupling agent and poly-p-xylylene were prepared in the above-mentioned manner, and each coated electrode surface was polished three times in a certain direction under application of a pressure of 10 g/cm². Ten liquid crystal devices were prepared in the same manner as in Example 3 by using these ten pairs of electrode plates. The Np-liquid crystal material and the distance between the electrode surfaces were the same as in Example 1.

Each of the so formed 10 liquid crystal devices had an electro-optical response completely uniform throughout the entire surface of the device. In these devices, the threshold voltage and saturation voltages were about 4.4 Vrms and about 6.6 Vrms, respectively. Each device had a maximum contrast ratio greater than 50 : 1.

EXAMPLE 5

In the same manner as described in Example 1, a coating of a silane coupling agent same as used in Example 4 having a thickness of about 0.5 $\mu$ was formed on the electrode surface of a transparent electrode plate prepared in the same manner as in Example 4, and the silane coupling agent coating was contacted at 90°C. under reduced pressure with chloro-p-xylylene obtained by the thermal decomposition of dichloro-p-xylylene, to form a coating of polychloro-p-xylylene having a thickness of about 0.1 $\mu$. Ten pairs of electrode plates having the electrode surface coated with the silane coupling agent and polychloro-p-xylylene were prepared in the abovementioned manner, and from these electrode plates, 10 liquid crystal devices were prepared in the same manner as in Example 3. The Np-liquid crystal material and the distance between the electrode surfaces were the same as in Example 1.

Each of the so formed ten liquid crystal devices had an electro-optical response completely uniform throughout the entire surface of the device, and in these devices the threshold voltage and saturation voltage were about 4.5 Vrms and about 6.7 Vrms, respectively. Each of these devices had a maximum contrast ratio greater than 50 : 1.

What we claim is:

1. A liquid crystal device of the torsion effect type comprising a cell of the structure comprising a pair of facing electrode plates and a nematic liquid crystal material having a positive dielectric anisotropy, which is inserted and supported between said two electrode plates, wherein facing electrode surfaces of said electrode plates coming into contact with the nematic liquid crystal layer are provided with a coating selected from the group consisting of poly-p-xylylene, its substituted product and mixtures thereof, and the surface of said coating is furnished with a predetermined orientation and a thin band of adhesive is provided on the peripheral edge of the electrode surface of at least one of said electrode plates to seal the space between said two electrode plates.

2. A liquid crystal device of the torsion effect type as set forth in claim 1 wherein the coating selected from the group consisting of poly-p-xylylene, its substituted product and mixtures thereof is composed of a polymer layer formed on the electrode surface by the thermal decomposition polymerization selected from the group consisting of di-p-xylylene, its substituted product and mixtures thereof.

3. A liquid crystal device of the torsion effect type as set forth in claim 1 wherein the coating selected from the group consisting of poly-p-xylylene, its substituted product and mixtures thereof has a thickness not greater than 1 $\mu$.

4. A liquid crystal device of the torsion effect type as set forth in claim 1 wherein said thin band of adhesive is of a high molecular adhesive of high temperature curing type having a curing temperature higher than about 150°C. and is used not only as a sealing agent but also as a spacer for said cell.

5. A liquid crystal device of the torsion effect type comprising a cell of the structure comprising a pair of facing electrode plates and a nematic liquid crystal material having a positive dielectric anisotropy, which is inserted and supported between said two electrode plates, wherein facing electrode surfaces of said electrode plates are provided with two layers consisting of a coating of an epoxy resin or silane coupling agent and a coating selected from the group consisting of poly-p-xylylene, its substituted product and mixtures thereof, said two layers being coated on the electrode surfaces in the above recited order, and the surface of said coating selected from the group consisting of poly-p-xylylene, its substituted product and mixtures thereof is furnished with a predetermined orientation and a thin band of adhesive is provided on the peripheral edge of the electrode surface of at least one of said electrode plates to seal the space between said two electrode plates.

6. A liquid crystal device of the torsion effect type as set forth in claim 5 wherein the thickness of the coating layer of the epoxy resin or silane coupling agent is not greater than 1 $\mu$.

7. A liquid crystal device of the torsion effect type as set forth in claim 5 wherein said thin band of adhesive is of a high molecular adhesive of high temperature curing type having a curing temperature higher than about 150°C. and is used not only as a sealing agent but also as a spacer for said cell.

* * * * *